F. W. FORD.
GAS SAVING DEVICE.
APPLICATION FILED JULY 14, 1911.
1,028,105.
Patented June 4, 1912.
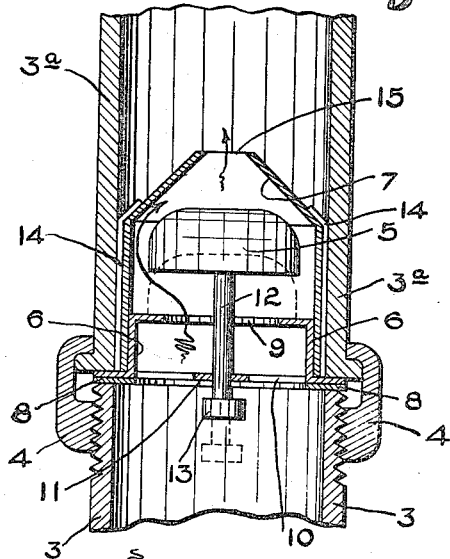
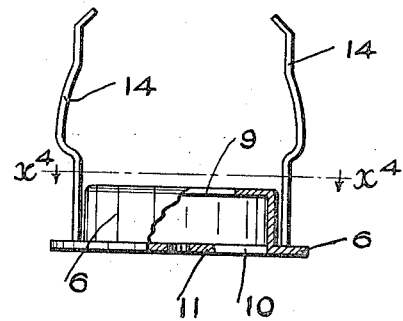
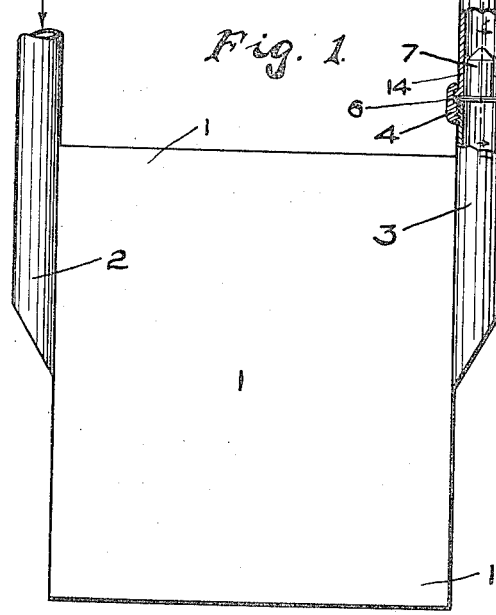
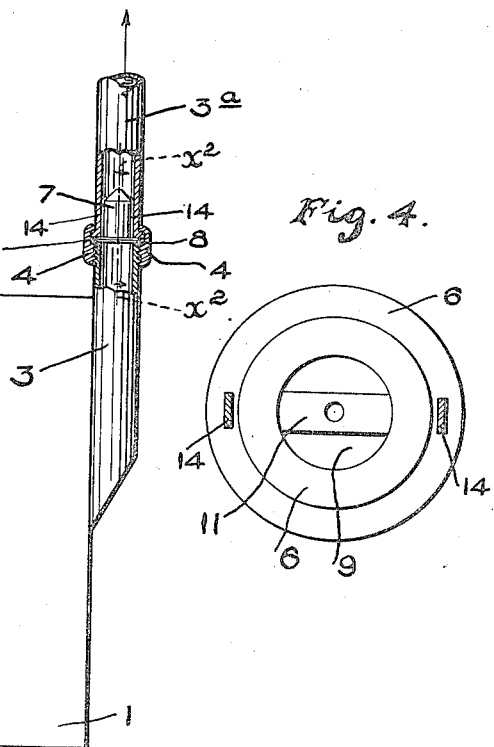
Witnesses;
H. A. Hillgren
Geo. Knutson
Inventor;
Frank W. Ford.
By his attorneys;
Williamson & Merchant

UNITED STATES PATENT OFFICE.

FRANK W. FORD, OF MINNEAPOLIS, MINNESOTA, ASSIGNOR OF ONE-THIRD TO ROBERT B. McFERRAN AND ONE-THIRD TO BLAIR S. HOAR, BOTH OF MINNEAPOLIS, MINNESOTA.

GAS-SAVING DEVICE.

1,028,105.  Specification of Letters Patent.  Patented June 4, 1912.

Application filed July 14, 1911. Serial No. 638,555.

*To all whom it may concern:*

Be it known that I, FRANK W. FORD, a citizen of the United States, residing at Minneapolis, in the county of Hennepin and State of Minnesota, have invented certain new and useful Improvements in Gas-Saving Devices; and I do hereby declare the following to be a full, clear, and exact description of the invention, such as will enable others skilled in the art to which it appertains to make and use the same.

My invention has for its object to provide an improved gas saving device or attachment for use in connection with gas meters, and to such ends, the invention consists of the novel devices and combinations of devices hereinafter described and defined in the claims.

It is a well known fact, that the registering mechanism of a gas meter is actuated by movement of gas from the receiving toward the delivery or service side thereof, and is not turned backward by a reverse or backward flow. The pressure in the gas supply means and in the meter during the day, varies considerably, and this produces a to and fro surging of the gas through the meter, under which, each movement of the gas from the receiving toward the delivery side of the meter actuates the registering mechanism of the meter, so that in this way, the meter is caused to register a flow of gas which is charged against the consumer, when, as a matter of fact, no gas has been used, or if gas has been used, this action causes the meter to register a flow of gas in excess of that which has actually been used.

My invention provides a simple and efficient valve mechanism which prevents backward flow of gas through the gas meter and thus causes the meter to register only the amount of gas which is actually used by the consumer.

In the accompanying drawings which illustrate the invention, like characters indicate like parts throughout the several views.

Referring to the drawings, Figure 1 is a view in side elevation, with some parts sectioned, and some parts broken away, showing my invention applied in connection with an ordinary gas meter; Fig. 2 is an enlarged vertical section taken on the line $x^2$ $x^2$ of Fig. 1; Fig. 3 is a detail view chiefly in side elevation, but with parts sectioned showing the valve seat of the attachment removed from working position; and Fig. 4 is a section on the line $x^4$ $x^4$ of Fig. 3.

The numeral 1 indicates the case or body of an ordinary or standard gas meter, the same having the customary gas inlet or supply pipe 2 and gas outlet or service pipe 3, the latter of which is, of course, on the consumer's side of the meter. The service pipe 3 is shown as divided at a point close to the meter case and the extended section $3^a$ thereof, is shown as flanged at its end and provided with a coupling sleeve 4 that is frictionally engageable with the said flange and has threaded engagement with that section 3 of the service pipe which is directly attached or connected to the meter case 1.

The improved check valve mechanism comprises a valve 5 and a valve seat 6, and preferably also, a housing 7, all of which parts, when assembled, are located within the receiving end of the service pipe $3^a$. The said valve seat 6 is provided with an out-turned flange which, and a pliable gasket 8, are clamped between the abutting ends of the pipe sections 3 and $3^a$ with a gas tight joint. The body of said valve seat 6 is telescoped into the lower end of the casing 7 and is provided with gas passages 9 and 10, and a transverse guiding bar 11. The valve 5 is provided with a stem 12 that works through and is guided by the bar 11 and is provided at its extreme lower end with a head 13 that limits the upward movement of the said valve. Normally, the body of the valve 5 is gravity seated on the upper portion of the valve seat 6 and closes the gas passage 9. The casing 7 is of less diameter than the interior of the pipe $3^a$, and clamping springs or prongs 14 are secured at one end to the flange of the valve seat 6, their lower portions being spaced slightly from the body of the said valve seat so as to permit the lower edge of the casing 7 to be inserted between the said body and spring prongs. When the device is forced into the pipe $3^a$, the spring prongs 14 will be nearly or quite straightened out and will exert sufficient force to hold the said valve mechanism in working position in the pipe $3^a$, even when the latter is disconnected from the pipe 3. The upper end portion of the casing 7 is preferably contracted and made conical, and provided with a central gas passage 15. The valve 5 may be of such weight that it will open only under the desired predetermined pressure, as for instance, two-inch gas pressure.

Operation: The operation of the improved valve mechanism is substantially as follows: When the gas is drawn through the service pipe for the use of the consumer, the check valve 5 will be raised into a position to open up the gas passage 9, and the gas will flow in the usual way, under ordinary conditions. The said check valve 5, however, normally closes the gas passage 9 so that, if at any time, pressure on the supply side of the meter is lowered, gas which has passed into the consumer's or service pipe cannot flow backward through the meter, but will be held until such time as the pressure on the supply side is again raised to a point equal to, or in excess of that on the service side. This, as is evident, prevents the meter from being operated by surging due to variations in pressures in the supply main. If the gas be supplied under abnormally high pressure, when drawn for service, the valve 5 will be moved upward into its extreme position and will then stand so close to the conical upper wall of the casing 7 that it will contract the escape passage from the said casing into the service pipe 3ª, and this will have the effect of decreasing the pressure to which the gas will be delivered to the burners, and will thus prevent blowing and waste of gas.

What I desire to claim and secure is:

1. The combination with a gas meter having inlet and outlet pipes, of a valve casing inserted within one of the said pipes, and a normally closed check valve controlling the passage of gas through said casing and adapted to be opened to permit a flow of gas from the supply to the service side of the said meter, the said casing having a delivery passage adapted to be restricted or partly closed by the said valve, when the latter is moved into an extreme position by high pressure of gas.

2. The combination with a gas meter having inlet and outlet pipes, of a valve seat having spring prongs frictionally holding the same in said service pipe, a valve normally closing the passage through said valve seat, and a casing having one end inserted between the body and spring prong of said valve seat and having its other end contracted and formed with a discharge passage, substantially as described.

In testimony whereof I affix my signature in presence of two witnesses.

FRANK W. FORD.

Witnesses:
HARRY D. KILGORE,
F. D. MERCHANT.